Nov. 9, 1948.  H. J. HAMMERLY  2,453,314
POWER DISTRIBUTION SYSTEM OF THE BUS BAR DUCT TYPE
Filed Oct. 16, 1947  3 Sheets-Sheet 1
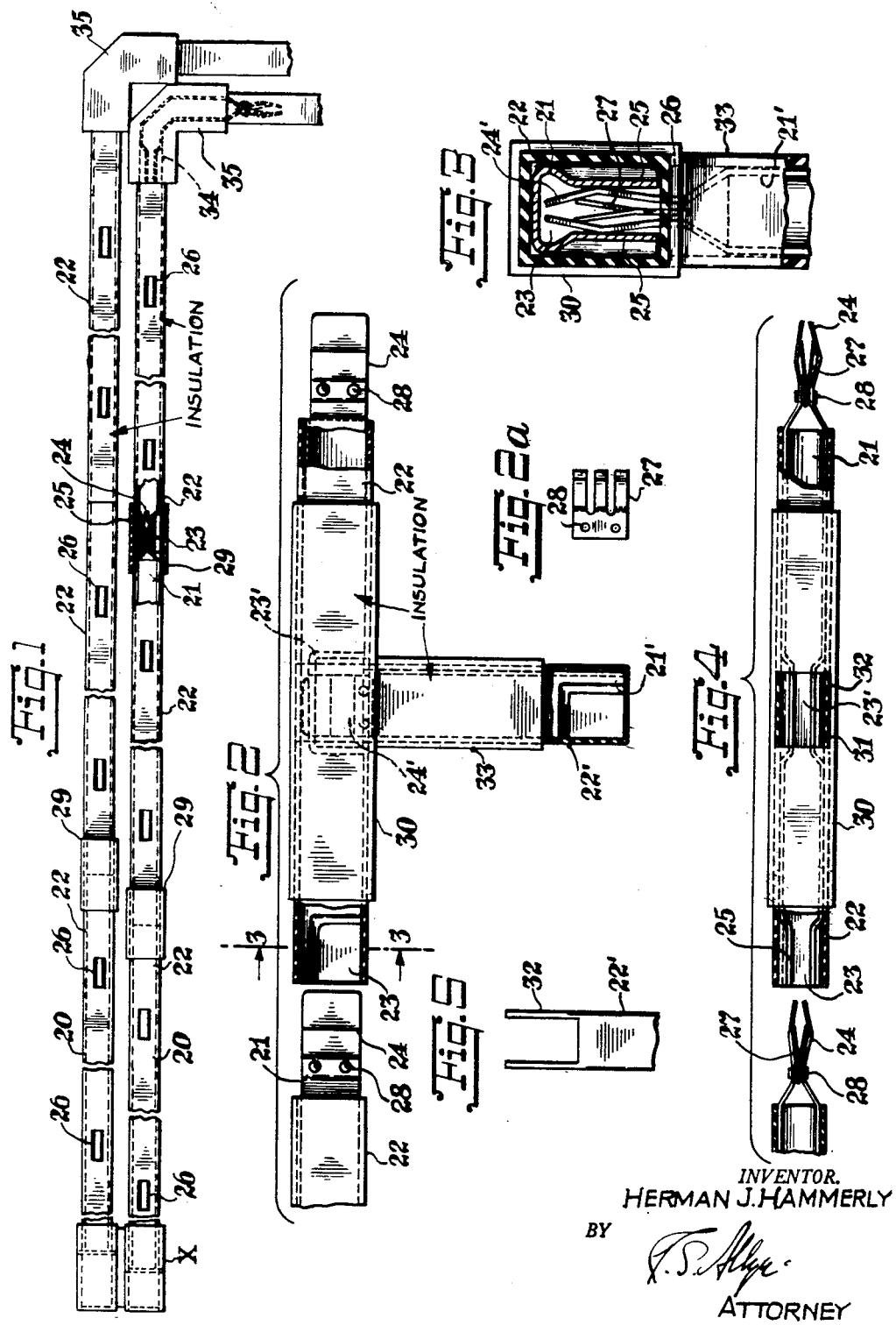
INVENTOR.
HERMAN J. HAMMERLY
BY
ATTORNEY Nov. 9, 1948.   H. J. HAMMERLY   2,453,314
POWER DISTRIBUTION SYSTEM OF THE BUS BAR DUCT TYPE
Filed Oct. 16, 1947   3 Sheets-Sheet 2
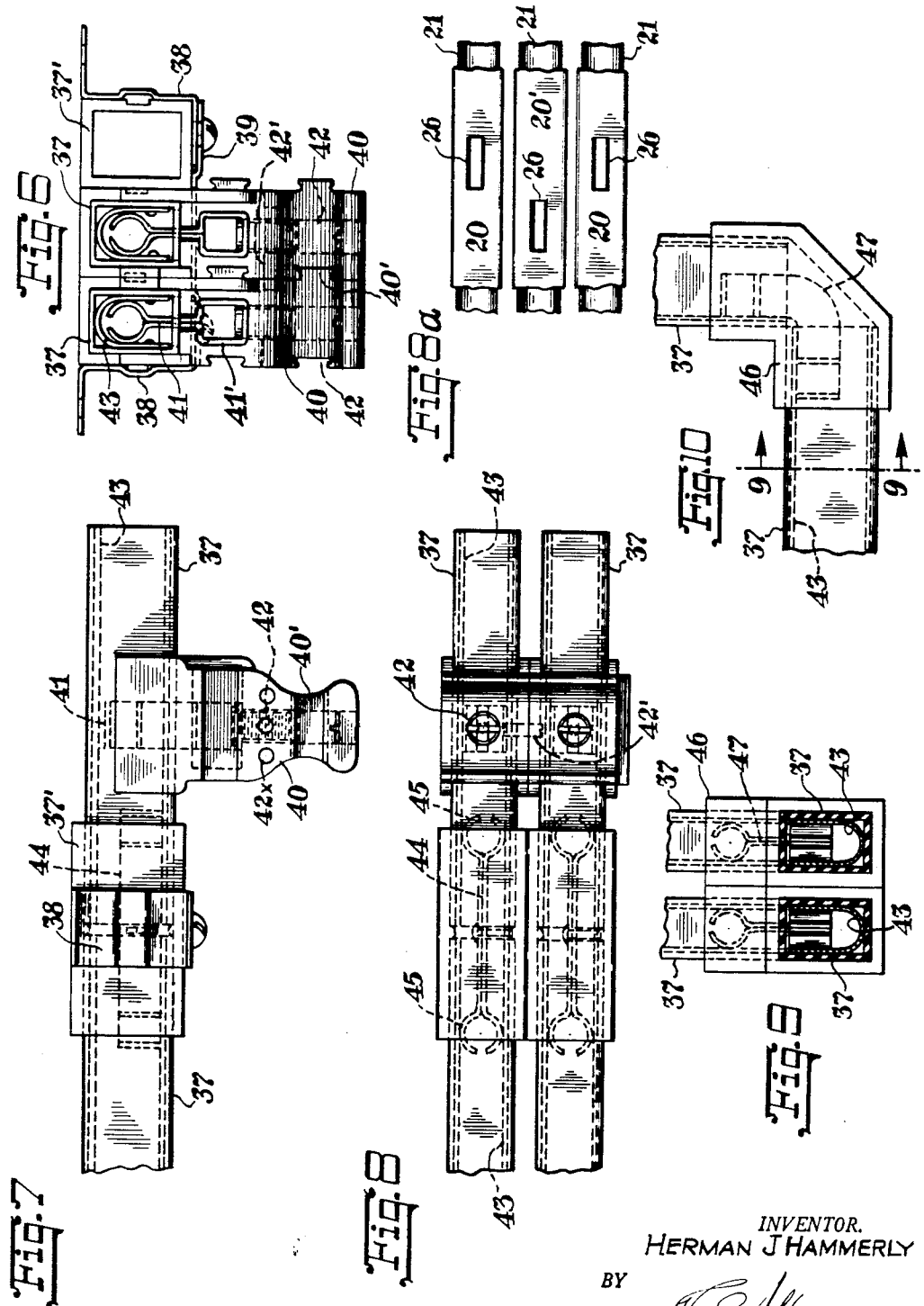
INVENTOR.
HERMAN J HAMMERLY
BY
ATTORNEY

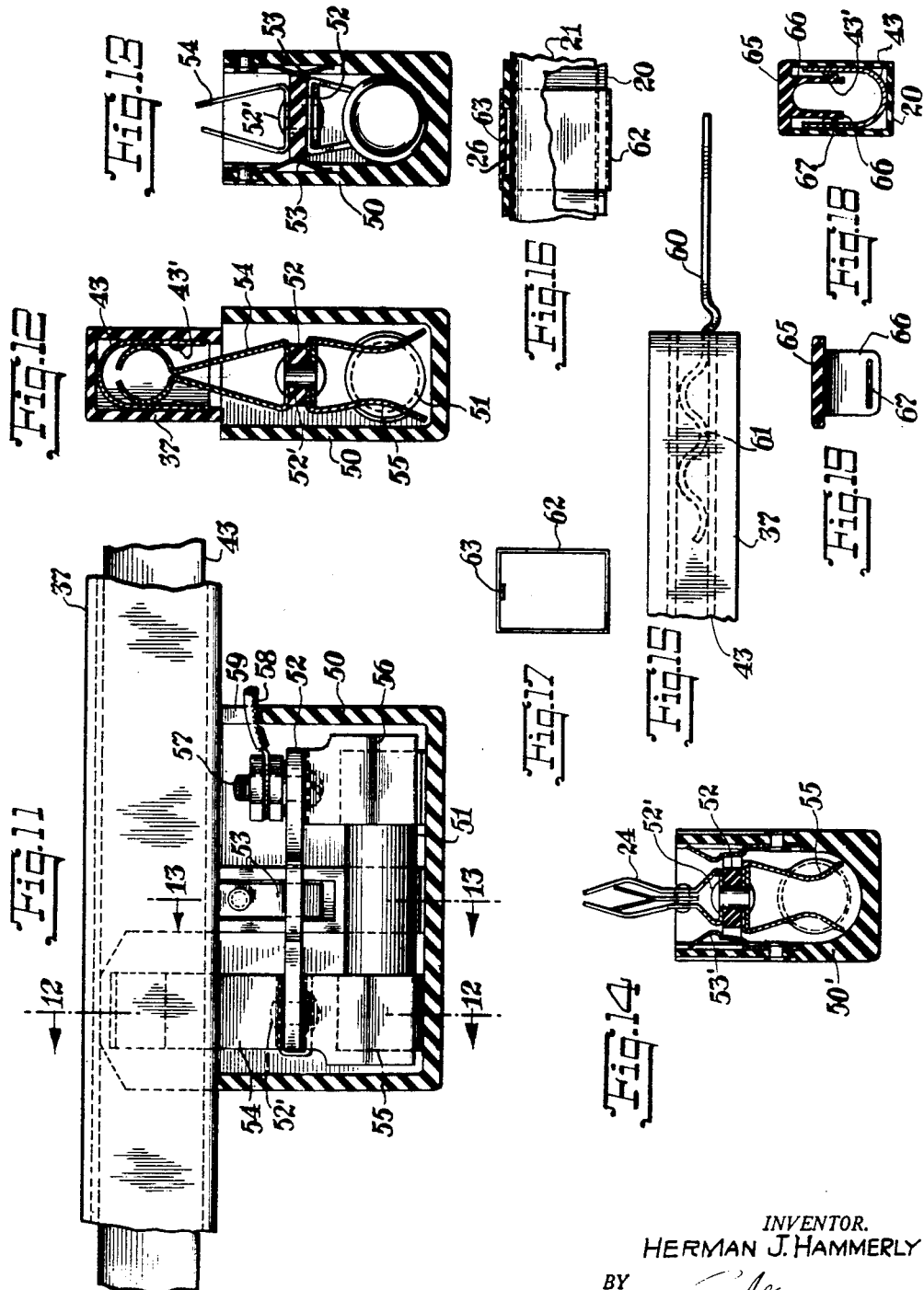

Patented Nov. 9, 1948

2,453,314

UNITED STATES PATENT OFFICE 2,453,314

POWER DISTRIBUTION SYSTEM OF THE BUS BAR DUCT TYPE

Herman John Hammerly, Plainville, Conn., assignor to The Trumbull Electric Manufacturing Company, Plainville, Conn., a corporation of Connecticut Application October 16, 1947, Serial No. 780,212

3 Claims. (Cl. 174—72)

One of the objects of my invention is to provide a system which is simple but flexible and readily adapted to installation in various ways and easy change from one arrangement to another.

Another object is to provide a bus bar which can be made cheaply and installed easily.

Another object is to provide an efficient and safe system of distribution.

Another object is to provide a system which can be readily polarized.

Another object is to provide branch take-off means for such a system.

Basicly the system employs sections of channel-like bus bars slidably enclosed in individual insulating tubes and provided at the end of each section and at intervals along its length with sockets adapted to receive a stab on the opposite end of another section or the stab of a branch take off device. Each bus bar conductor is thus enclosed in its own individual duct.

Details of the system and of branch connectors will be understood from the following.

Fig. 1 is an elevation of two bus bar duct runs arranged side by side and showing right angled turns at one end on a small scale.

Fig. 2 is a fragmentary side view and partial section on a larger scale showing the right end of a bus bar in position to join the adjacent bus bar and a branch take-off.

Fig. 2a is a detail view of a reinforcement for the stab end of a bus bar.

Fig. 3 is a section taken on the plane of the line 3—3 of Fig. 2 on a still larger scale.

Fig. 4 is a view of the bus bar and duct of Fig. 2 looking upwardly.

Fig. 5 is a fragmentary view of the end of one of the insulating tube sections for use at a branch take off.

Fig. 6 is an end view and partial cross section showing a modified form of bus bar and branch plug connections and means for mounting the ducts.

Fig. 7 is a side view and partial section of the same.

Fig. 8 is a view of the parts of Fig. 7 looking upwardly.

Fig. 8a is a face view of fragments of three bus bars with their ducts in which the openings for access are arranged offset so as to ensure proper polarity connection when take-off plugs are inserted.

Fig. 9 is a sectional view of the bus bars and ducts of Fig. 10 taken on the plane of the line 9—9.

Fig. 10 is a side view of the parts of Fig. 9 showing one form of corner junction.

Fig. 11 is a side view and partial section showing a fuse protection branch take-off device.

Fig. 12 is a cross-sectional view of the same on the plane of the line 12—12 of Fig. 11.

Fig. 13 is a cross-sectional view on the plane of the line 13—13 of the housing of Fig. 11.

Fig. 14 is a cross-sectional view of a take-off device showing the form of stab of Figs. 2, 3 and 4 and another arrangement for holding it in place in the housing.

Fig. 15 is a detail view showing a modified form of terminal device.

Fig. 16 is a fragmentary longitudinal sectional view showing one form of closure for a stab opening.

Fig. 17 is an end view of the closure of Fig. 16.

Fig. 18 is a transverse sectional view showing another form of closure for a stab opening.

Fig. 19 is a side view of the closure of Fig. 18.

The invention is applicable to installations involving one or more conductors. For instance in Fig. 1, I have shown two runs 20, 20 whose bus bars 21 may be considered as parts of either a common circuit or as being separate parts of a common conductor. Each bus bar is enclosed in a duct 22 formed of a tube of suitable insulating material such as indurated fibre or any other material considered satisfactory under the conditions of use. An end closure X may be provided. Each bus bar is formed of suitable metal in channel form and made up in sections of suitable length. Each section has a socket portion 23 at one end and a stab portion 24 at the other end adapted to fit snugly into a socket on the connected section.

Preferably each bus bar section is enclosed in an individual insulating tube 22 of a little less length than the bus bar so that with respect to a given section one end of the bus bar, such as the stab end, projects beyond its enclosing tube sufficiently to enable two sections of bus bars to be electrically and mechanically joined when the enclosing tube sections abut against each other. Each bus bar section however is slidable in its tube so that considerable adjustment can be made.

Preferably each socket 23 is formed by bending the side walls of the bus bar channel inwardly as shown in Figs. 2, 3, and 4. These short inwardly bent portions form jaws 25 adapted to receive the wedge-shaped stab end 24. Each bus bar section is also provided with similar socket portions 23' at intervals along its length adapted to receive the stab of another bus bar section or the stab or blade of any other branch connector or take-off device. Each stab portion is formed by bending the side walls of the bus bar as shown in Figs. 2 and 4. The enclosing tube is provided with entrance openings 26 leading to the respective longitudinally disposed sockets 23' for insertion of branch connections.

From the foregoing, it will be seen that each bus bar section is formed of a single strip of metal with an integral terminal stab at one end and a socket at the other end and intervening sockets. Although this is the preferred construction it will be understood that bus bar sections could be formed with sockets at both ends or with integral stabs at both ends to facilitate installation in special cases.

A stab end may be reinforced by an insert 27 having spring fingers secured in place between the sides of the stab end by rivets 28.

To further insure protection I provide an insulating sleeve 29 enclosing the abutting ends of the tubes of adjacent sections.

When it is desired to connect a branch bus bar 21' at right angles to a given run, as shown in Figs. 2 and 4, I provide an insulating sleeve 30 which has an opening 31 adapted to receive the stab 24' of the bus bar 21' and its tube 22'. This sleeve 30 is located on the tube 21 so as to bring the opening 31 in register with one of the sockets 23' of the bus bar. The tube 22' may have extensive walls 32 to embrace the bus bar at the socket 23'. Additional protection is provided by the insulating sleeve 33.

When an angle is to be turned in a given run, as shown at the right in Fig. 1, the bus bars are suitably connected by a connector 34 which may be formed with a socket on one end and a stab on the other end or a socket on each end or a stab on each end depending upon whether the ends of the bus bars to be connected are provided with sockets or stabs and enclosed in an insulating housing joint 35 which receives the ends of the sections to be connected.

In Figs. 6, 7 and 8, I have shown one method of mounting duct tube sections such as 37, 37 by brackets 38, 38 and a cross strap 39 embracing the connecting sleeves 37', 37'.

These figures also show branch connector plugs 40, 40, each having a blade or stab 41 suitably shaped to connect with the bus bar within its tube. In this case, I have shown a bus bar 43 of a different channel-shaped cross-section. This bus bar may have internal bosses 43' to assist in retaining the stab. Each stab has a socket portion 41' adapted to receive a branch conductor inserted from the side (not shown) which can be clamped by a screw 42. Bus bar sections can be connected by a connector 44 having jaws 45, 45 adapted to fit in the ends of the adjacent sections as shown in Fig. 8.

The adjacent plugs may have interlocking parts 40' if desired and the sockets in adjacent ducts may be offset or otherwise arranged to ensure connecting of the plug blades with the bus bars of proper polarity.

For this purpose, one plug can be slid lengthwise of its duct and the two (or more) plugs locked against further movement by a pin 42' inserted in one of the openings 42x.

Fig. 8a shows three bus bars with their ducts arranged parallel but with the openings 26, 26' arranged offset so as to ensure proper polarity connections of the multiple plugs such as just described.

Figs. 9 and 10 show means for connecting two bus bar sections of U-shaped section by an angular insulating joint 46 containing an electrical connector 47 which has jaws at its ends to engage in the ends of the bus bars to be connected.

In Figs. 11 to 14, inclusive, I have shown a fuse-protected branch circuit connector as applied to a bus bar duct system of my invention which may have a bus bar of the section of Fig. 3 or that of Fig. 12.

The insulating housing is constructed to contain a fuse device 51 of any suitable type. This fuse is suspended from an insulating support 52 held in place by springs 53 in the sides of the housing so that the support and attached parts may be inserted and removed from the housing. This support carries a stab or blade 54 of suitable shape to engage in the channel-like bus bars 43 (or 21 in Fig. 3). Fuse clip 55 is electrically connected to stab 54 and fuse clip 56 is electrically connected to the binding post 57 for a conductor 58 which passes through the opening 59.

Fig. 14 shows a similar housing 50' but with the clips 53' for holding the support 52 mounted in a different location. This figure also shows a stab 24 of the form suitable for use in bus bar sockets of the form of Figs. 1 to 4.

In Fig. 15, I have shown a special form of terminal connector 60 which frictionally fits in the end of a bus bar and may be suitably formed at the right hand end for any suitable purpose.

It will be understood that the duct sections are provided with a number of openings leading to sockets for branch take-off connections so that various connections can be made from time to time. Obviously in such a system there will be times when many of the take-off parts will not be used. In such cases, the unused openings in the ducts can be closed in any suitable manner.

Figs. 16 and 17 show one form of closure 62 for an entrance opening in the duct. This is a sleeve slidable along the duct 20 and which may have a boss 63 to resiliently fit in the opening 26 in the duct.

Figs. 18 and 19 show another form of closure 65 especially for use in a duct system employing a U-shaped bus bar 43 like that of Figs. 6–9. This closure has arms 66 adapted to be inserted into the bus bar through the opening to be closed. These arms may have bosses 67 adapted to coact with the bosses 43' within the bus bar.

It will be seen from the foregoing that the system is capable of installation in many different ways and is particularly useful for laboratory work where frequent changes have to be made to accommodate the requirements of the system.

I claim:

1. A bus bar duct section comprising a one-piece bus bar of channel-shaped cross section having a socket integral therewith at one end and a wedge-shaped stab integral with the other end and an insulating tube surrounding said bus bar but removable therefrom.

2. A bus bar duct section comprising a one-piece bus bar of channel-shaped cross section having a socket integral therewith at one end and a wedge-shaped stab integral with the other end and an insulating tube surrounding said bus bar but removable therefrom, portions of the side walls of said bus bar being bent inwardly to form a socket for receiving an inserted stab of a branch connector.

3. A power distribution system including a bus bar of channel-shaped cross section having a socket formed by the side walls at one end and a stab formed by the united side walls at the other end and an insulating tube enclosing most of said bus bar.

HERMAN JOHN HAMMERLY.

REFERENCES CITED

The following references are of record in the file of this patent:

UNITED STATES PATENTS

| Number | Name | Date |
|---|---|---|
| 460,725 | Markle | Oct. 6, 1891 |
| 2,038,107 | Harvey | Apr. 21, 1936 |
| 2,043,796 | Frank | June 9, 1936 |
| 2,107,412 | Frank | Feb. 8, 1938 |
| 2,166,752 | Cullen | July 18, 1939 |
| 2,230,423 | Bassette et al. | Feb. 4, 1941 |
| 2,238,834 | Travers | Apr. 15, 1941 |
| 2,264,075 | Frank | Nov. 25, 1941 |
| 2,318,861 | Huguelet | May 11, 1943 |

FOREIGN PATENTS

| Number | Country | Date |
|---|---|---|
| 275,225 | Great Britain | Nov. 3, 1927 |